United States Patent

Castel et al.

[11] Patent Number: 5,176,065
[45] Date of Patent: Jan. 5, 1993

[54] BRAKE BOOSTER

[75] Inventors: Philippe Castel, Paris; Pascal Le Normand, Aulnay-sous-Bois, both of France

[73] Assignee: Bendix Europe Services Techniques, Drancy, France

[21] Appl. No.: 779,209

[22] Filed: Oct. 18, 1991

[30] Foreign Application Priority Data

Nov. 13, 1990 [FR] France .................. 90 14064

[51] Int. Cl.$^5$ .............................. F15B 9/10
[52] U.S. Cl. ................... 91/376 R; 74/512; 74/526; 74/560; 303/4; 188/357
[58] Field of Search .............. 74/512, 526, 560; 91/376 R; 60/594; 303/4, 114 P N; 188/357

[56] References Cited

FOREIGN PATENT DOCUMENTS

| 0303470 | 11/1989 | European Pat. Off. |
|---|---|---|
| 0389205 | 9/1990 | European Pat. Off. |
| 85486 | 9/1921 | Fed. Rep. of Germany ........ 74/512 |
| 50-6694 | 3/1975 | Japan .................. 74/512 |
| 2089453 | 6/1982 | United Kingdom. |
| 8202176 | 7/1982 | World Int. Prop. O. |
| 8604869 | 8/1986 | World Int. Prop. O. |
| 9000127 | 1/1990 | World Int. Prop. O. |

*Primary Examiner*—Edward K. Look
*Assistant Examiner*—Todd Mattingly
*Attorney, Agent, or Firm*—Larry J. Palguta; Ken C. Decker

[57] ABSTRACT

A pneumatic brake booster (10) capable of operating without being actuated by a pedal (14), possesses at least one fixed part (36) and a control rod (12) with which the pedal cooperates (14). A sleeve (30) bears against the pedal (14) and partially surrounds the control rod (12), the control rod (12) possesses a shoulder (32) forming a stop cooperating with the sleeve (30) at rest and when the brake booster is actuated by the pedal (14), and the sleeve (30) is loaded by a spring (34) maintaining the pedal (14) at a given distance from the fixed part (36) of the brake booster (10) while the pedal (14) is not actuated.

8 Claims, 1 Drawing Sheet

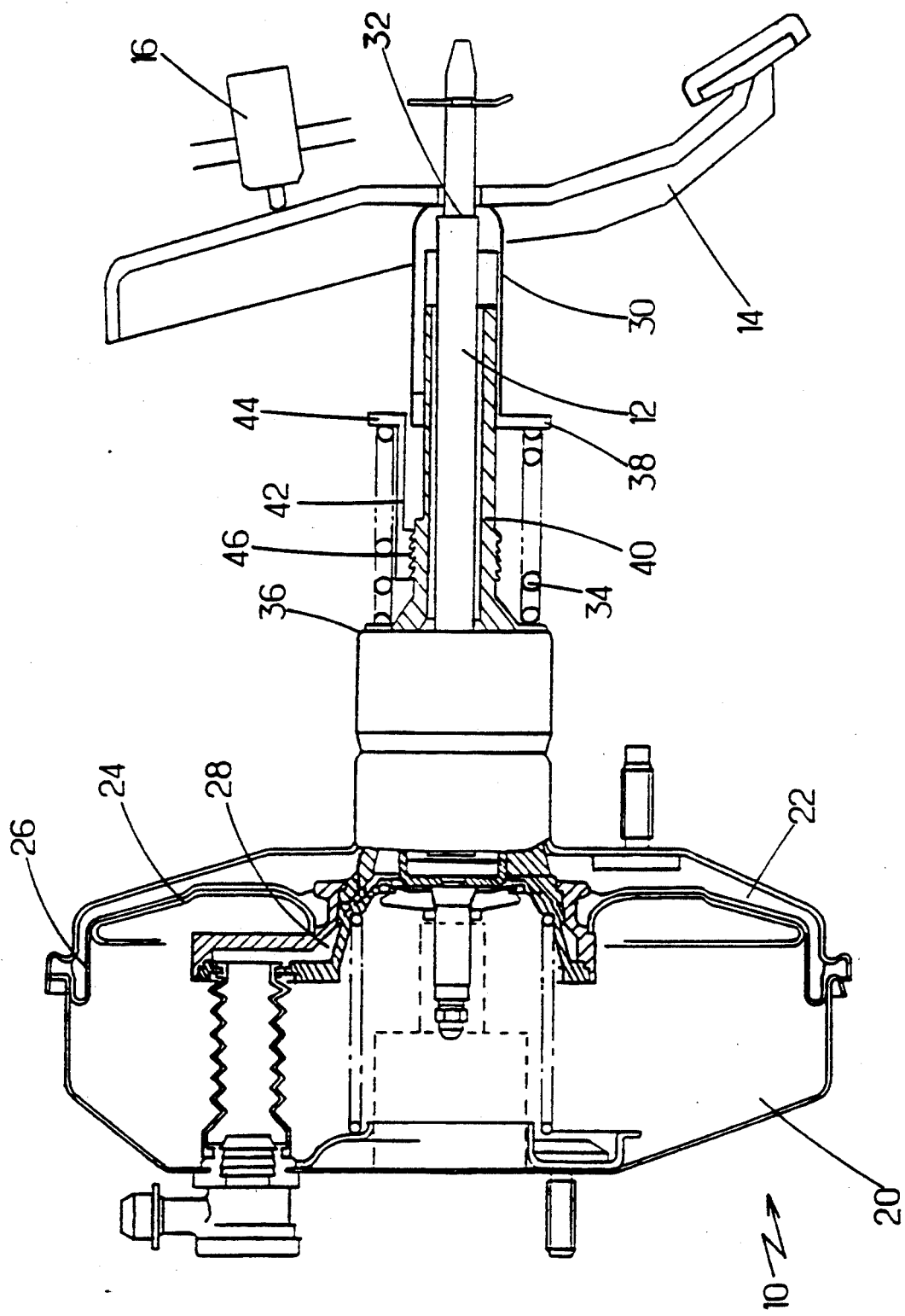

BRAKE BOOSTER

BACKGROUND OF THE INVENTION

The present invention concerns a pneumatic brake booster capable of operating without being actuated by a pedal, and possessing at least one fixed part and a control rod with which the pedal cooperates.

Such a brake booster finds a preferred application in the boosting of the braking of motor vehicles fitted with a device allowing the slowing down of a driven wheel tending to spin on the running surface or with a device for automatic braking in response to a signal emitted, for example, by a beacon or a radar.

Such a brake-booster is, for example, described in EP-A-0 303 470, and its operation, well known to a person skilled in the art, will not be described in detail here.

The brake-booster from this document possesses one grave disadvantage in that, during its operation in automatic mode, the brake pedal is moved by the control rod as if it had been actuated by the driver. Because of this, if the driver wishes at that moment to press on this pedal himself, he fails to find it in its usual place, which may result in a moment of panic detrimental to good driving. In addition, in the automatic operating mode, the pedal being depressed, it becomes impossible to detect the fact that the driver himself wishes to brake, which may have grave consequences, especially if the brake booster is used with an anti-wheelspin device. The present invention has the object of preventing these disadvantages.

SUMMARY OF THE INVENTION

According to the invention, a sleeve bears against the pedal and partially surrounds the control rod, the control rod possesses a shoulder forming a stop cooperating with the sleeve at rest and when the brake booster is actuated by the pedal, and the sleeve is loaded by a spring maintaining the pedal at a given distance from a fixed part of the brake booster while the pedal is not actuated.

BRIEF DESCRIPTION OF THE DRAWINGS

The invention will now be described by way of example with reference to the accompanying drawing in which:

the single figure shows schematically and partially in section a brake booster in accordance with the present invention.

DETAILED DESCRIPTION OF THE INVENTION

Now with reference to this figure, a person skilled in the art will recognize a pneumatic brake booster 10 fitted with its control rod 12, as well as the actuating pedal 14, a displacement of which is detected by a switch 16 controlling the switching on of the rear brake lights.

The brake-booster is of a conventional type possessing two chambers 20, 22 separated by a piston 24 and a rolling membrane 26. A pipe 28 allows the chamber 22 to be supplied directly with air under atmospheric pressure in order to make the brake booster operate without actuation of the pedal 14 by controlling a simple electrovalve (not shown).

A difference between the pressures prevailing in the two chambers causes displacement of the piston 24 and the control rod 12. A sleeve 30 is arranged to bear against the pedal 14 on the control rod 12. The end of this sleeve 30 possesses an orifice through which passes the control rod 12. The latter is provided with a shoulder 32 forming a stop to cooperate with the end of the sleeve 30.

Thus when the brake booster is operated by the pedal, the latter bears on the sleeve 30, which bears on the shoulder 32 of the rod 12 which thus moves down like the pedal 14.

The sleeve 30 is loaded by a helical spring 34 bearing on a fixed part of the brake booster. In the example shown, this fixed part is constituted by the housing 36 of the brake booster 10, but it could also be constituted by the cover of a system for reducing the lost motion.

The spring 34 advantageously offers a very small preload just intended to overcome the forces generated by gravity on the pedal 14 and by the spring of the switch 16 on the pedal 14.

In order to prevent this spring 34 causing an extra lost motion for the pedal 14, it is necessary that, at rest, the pedal 14, the sleeve 30 and the shoulder 32 of the control rod 12 are respectively in contact. With this object, the spring 34 is of the type having an extension limited by a strut of a given length, adjustable in the example shown.

This strut is constituted by a fixed cylinder 40 solidly attached to the housing 36 of the brake booster 10, and by a fork 42 fitted over the cylinder 40. The spring is then, at rest, trapped between the teeth 44 of the fork 42 and the housing 36. Hence, the spring 34 no longer acts on the sleeve 30 at rest.

A locking means is provided to immobilize the fork 42 with respect to the cylinder 40. This locking means is, advantageously, constituted by two sets of teeth 46 solidly attached to the fork 4 and the cylinder 40 respectively and working together. It could also be constituted by a single set of teeth solidly attached either to the fork 42 or to the cylinder 40 and engaging in the other.

The sleeve 30 possesses centrifugal fingers 38 on which the spring 34 bears and which protrude between the teeth 44 of the fork 42.

Thus, in automatic operating mode, the control rod 12 moves down into the brake booster 10, but the pedal 14 stays immobile under the action of the sleeve 30 and the spring 34. Because of this, the switch 16 detects no movement of the pedal 14. On the other hand, if, while the brake booster is operating in automatic mode, the driver wishes to brake, the movement of the pedal would be immediately detected by the switch 16, which will have the effect, for example, of switching off the automatic mode control.

It is understood that numerous modifications may be applied to the invention without leaving the scope defined by the accompanying claims.

What we claim is:

1. A pneumatic brake booster capable of operating without being actuated by a pedal, said brake booster possessing at least one fixed part and a control rod with which said pedal cooperates, a sleeve bearing against said pedal and partially surrounding said control rod, said control rod having a shoulder forming a stop cooperating with said sleeve at rest and when the brake booster is actuated by said pedal, and said sleeve being loaded by a spring maintaining said pedal at a given distance from said fixed part of the brake booster when said pedal is not actuated.

2. The brake booster according to claim 1, wherein said spring is a helical spring having an extension limited by a strut of a given length.

3. The brake booster according to claim 2, wherein said given length determines said given distance.

4. The brake booster according to claim 3, wherein said given length of said strut is adjustable.

5. The brake booster according to claim 4, wherein said strut is constituted by a cylinder solidly attached to said fixed part and surrounding said rod and onto which a fork is fitted, and means for locking said fork on said cylinder being provided.

6. The brake booster according to claim 5, wherein said locking means is constituted by a set of teeth solidly attached to one of the cylinder and the fork and engaging the other.

7. The brake booster according to claim 5, wherein said locking means is constituted by two sets of teeth solidly attached to the fork and to the cylinder respectively and working together.

8. The brake booster according to claim 5, wherein said sleeve has centrifugal fingers cooperating with said spring and protruding between the teeth of said fork.

* * * * *